US007756872B2

(12) United States Patent
Narusawa (10) Patent No.: US 7,756,872 B2
(45) Date of Patent: Jul. 13, 2010

(54) SEARCHING DEVICE AND PROGRAM PRODUCT (75) Inventor: Atsushi Narusawa, Hino (JP)

(73) Assignee: Seiko Epson Corporation, Tokyo (JP)

( * ) Notice: Subject to any disclaimer, the term of this patent is extended or adjusted under 35 U.S.C. 154(b) by 401 days.

(21) Appl. No.: 11/483,624

(22) Filed: Jul. 11, 2006

(65) Prior Publication Data
US 2007/0016567 A1 Jan. 18, 2007

(30) Foreign Application Priority Data
Jul. 14, 2005 (JP) ............... 2005-205810
Jun. 12, 2006 (JP) ............... 2006-162376

(51) Int. Cl.
G06F 7/00 (2006.01)
G06F 17/30 (2006.01)
(52) U.S. Cl. .................... 707/736; 707/741
(58) Field of Classification Search .......... 707/3, 707/6, 736, 741
See application file for complete search history.

(56) References Cited
U.S. PATENT DOCUMENTS

| 5,051,947 | A | * | 9/1991 | Messenger et al. ............ 707/3 |
| 5,819,261 | A | * | 10/1998 | Takahashi et al. ............. 707/3 |
| 5,937,422 | A | * | 8/1999 | Nelson et al. ............... 715/206 |
| 5,949,906 | A | * | 9/1999 | Hontani et al. .............. 382/177 |
| 6,035,268 | A | * | 3/2000 | Carus et al. .................. 704/9 |
| 6,272,456 | B1 | * | 8/2001 | de Campos .................. 704/8 |
| 6,671,404 | B1 | * | 12/2003 | Kawatani et al. ............ 382/190 |
| 7,003,516 | B2 | * | 2/2006 | Dehlinger et al. ............ 707/5 |
| 2005/0038866 | A1 | | 2/2005 | Noguchi et al. | |

FOREIGN PATENT DOCUMENTS

| CN | 1271131 A | 10/2000 |
| CN | 1589444 A | 3/2005 |
| JP | 04-104367 | 4/1992 |
| JP | A-2000-305935 | 11/2000 |

(Continued)

OTHER PUBLICATIONS

Manber et al., A Fast Algorigthm for Multi-Pattern Searching, May 1994, pp. 1-11.*

(Continued)

Primary Examiner—James Trujillo
Assistant Examiner—Jorge A Casanova
(74) Attorney, Agent, or Firm—Oliff & Berridge, PLC (57) ABSTRACT A searching device includes: a text memory that stores text data, the text data showing at least one character strings, the character strings including n-number of characters, n being a natural number; an input device that receives an input of a keyword, the keyword including m-number of characters, m being a natural number that satisfies $m \leq n$; a selector that selects at least one search character from the m-number of characters included in the keyword, the search characters including a-number of characters, a being a natural number that satisfies $a \leq m$; a search window controller that sets a search window, the search window including b-number of characters, the b-number of characters being selected from the text data, b being a natural number that satisfies $b \geq a$; a determining unit that determines whether the search window includes the keyword on the basis of a comparison result of the characters in the search window with the search characters.

6 Claims, 9 Drawing Sheets

FOREIGN PATENT DOCUMENTS

JP      A 2001-337993      12/2001

OTHER PUBLICATIONS

Awa, Fusei, "Boyer-Moore Character String Search Algorithm" (with translation), Date: Unknown, pp. 5-10.*

Awa, Fusei. "Boyer-Moore Character String Search Algorithm" (with translation).

Ehara, Terumasa. "Basics of Natural Language Processing—2" (with translation).

* cited by examiner

: SEARCH WINDOW

FIG. 11A As in other countries, Japanese Patent Law adopts a so-called "First to File" policy.
FIG. 11B As in other countries, Japanese Patent Law adopts a so-called "First to File" policy.
FIG. 11C As in other countries, Japanese Patent Law adopts a so-called "First to File" policy.
(...OMITTED...)
FIG. 11D As in other countries, Japanese Patent Law adopts a so-called "First to File" policy.
FIG. 11E As in other countries, Japanese Patent Law adopts a so-called "First to File" policy.
FIG. 11F As in other countries, Japanese Patent Law adopts a so-called "First to File" policy.
FIG. 11G As in other countries, Japanese Patent Law adopts a so-called "First to File" policy.
FIG. 11H As in other countries, Japanese Patent Law adopts a so-called "First to File" policy.
FIG. 11I As in other countries, Japanese Patent Law adopts a so-called "First to File" policy.
FIG. 11J As in other countries, Japanese Patent Law adopts a so-called "First to File" policy.
FIG. 11K As in other countries, Japanese Patent Law adopts a so-called "First to File" policy.
FIG. 11L As in other countries, Japanese Patent Law adopts a so-called "First to File" policy.

┌─────┐
│     │ :SEARCH WINDOW
└─────┘

SEARCHING DEVICE AND PROGRAM PRODUCT

The entire disclosure of Japanese Patent Applications No. 2005-205810, filed on Jul. 14, 2005, and No. 2006-162376, filed on Jun. 12, 2006 are expressly incorporated by reference herein.

BACKGROUND

1. Technical Field

The present invention relates to searching for a character string in text data.

2. Related Art

In recent years, OCRs (Optical Character Recognition systems) have come into widespread use. Such systems are used for inputting/reading a document, for generating electronic data (image data) from the read/input document, and for generating text data from the image data. The generated text data may then be searched for particular character strings.

Figure 9A:
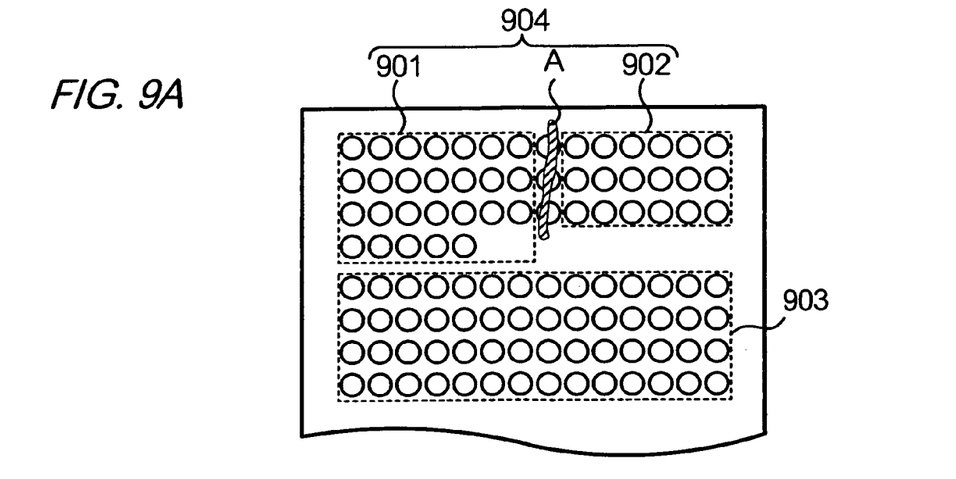
FIG. 9A shows an example of a document that includes soiling A.
Figure 9B:
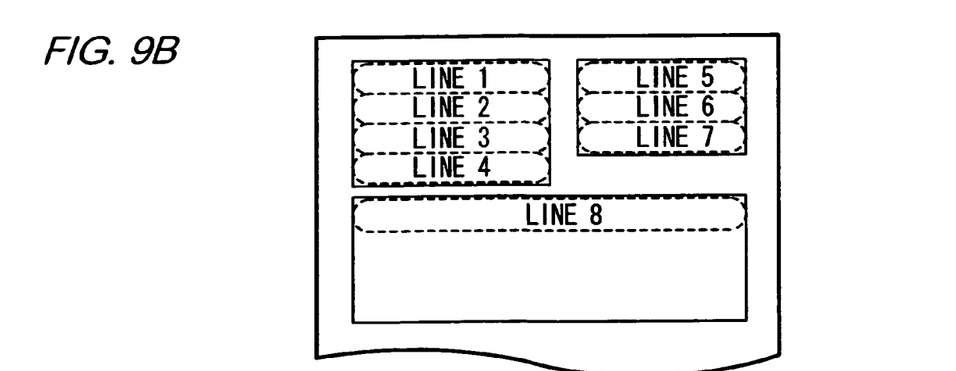
FIG. 9B shows a result of character recognition for the document shown in FIG. 9A.
Figure 9C:
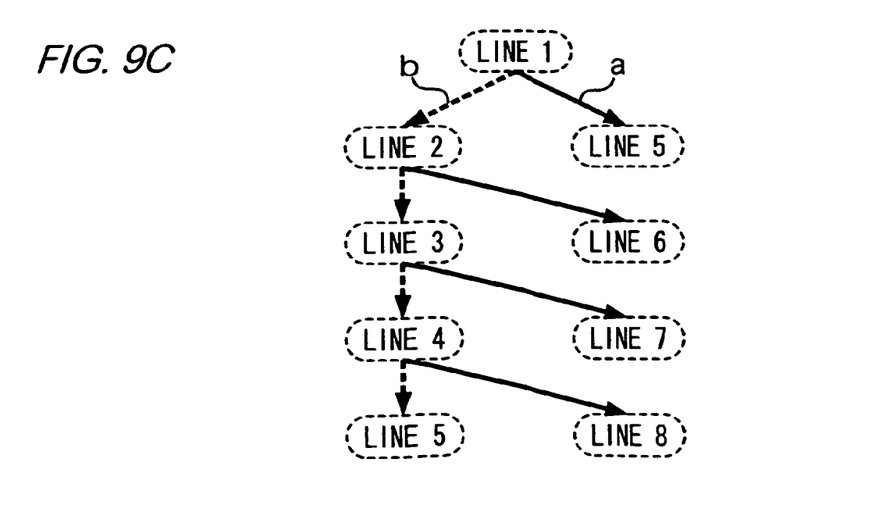
FIG. 9C is a drawing illustrating the character recognition malfunction that is shown in FIG. 9B.
Figures 10A, 10B:
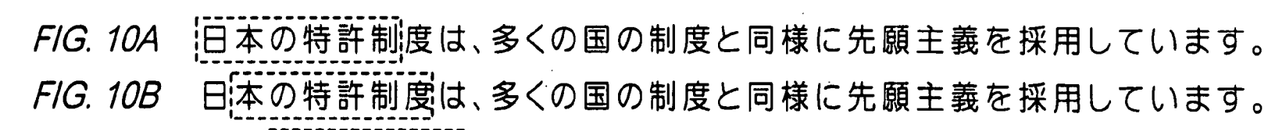
FIG. 10 shows examples of the search window in the second embodiment.
Figure 10C:
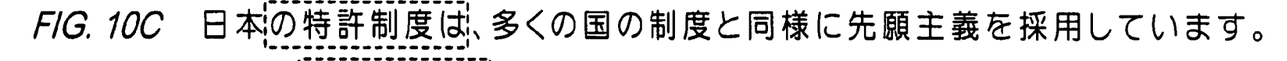
Figure 10D:
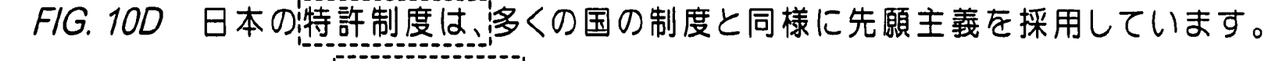
Figure 10E:
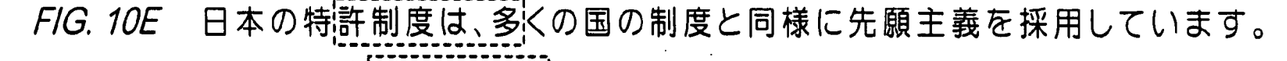
Figure 10F:
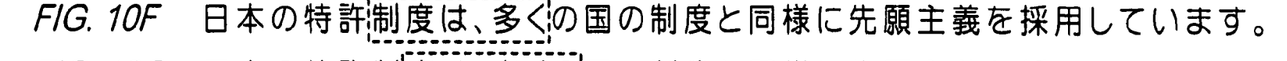
Figure 10G:
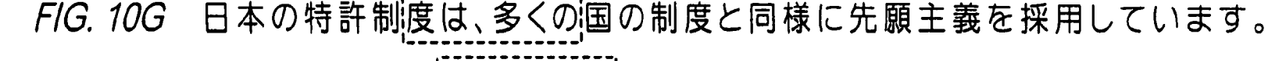
Figure 10H:
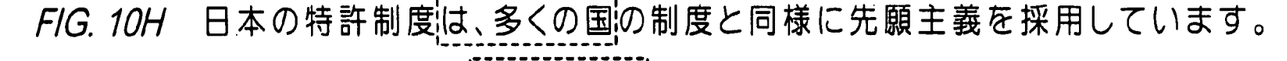
Figure 10I:
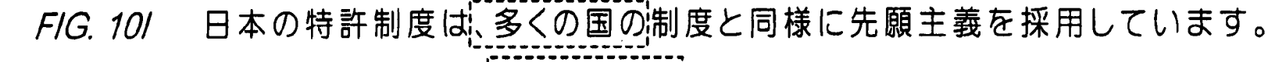
Figure 10J:
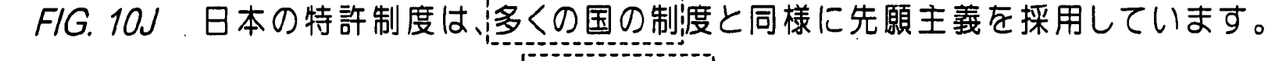
Figure 10K:
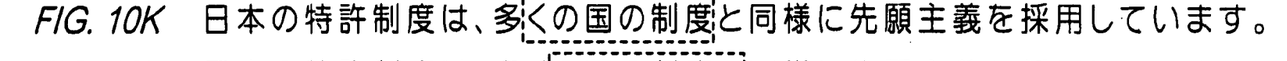
Figure 10L:
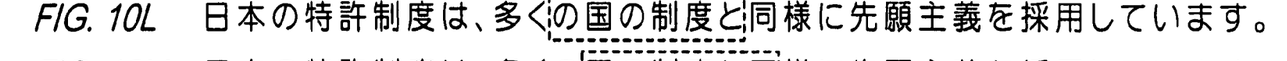
Figure 10M:
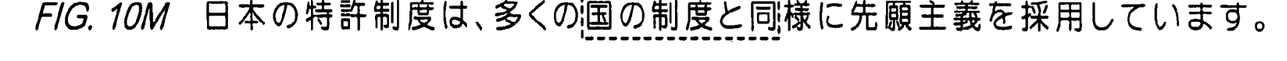
Figure 11A:
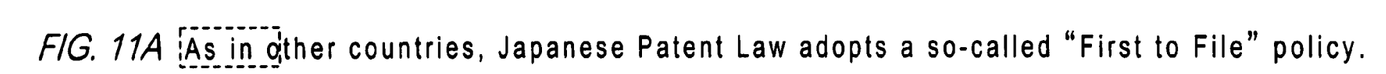
FIG. 11 shows examples of the search window in the third embodiment.
Figure 11B:
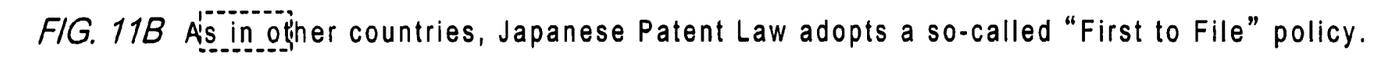
Figure 11C:
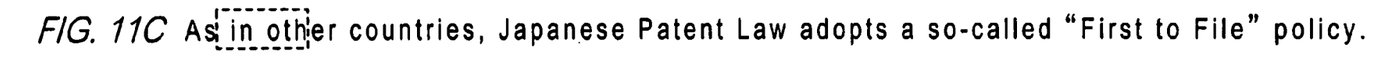
Figure 11D:
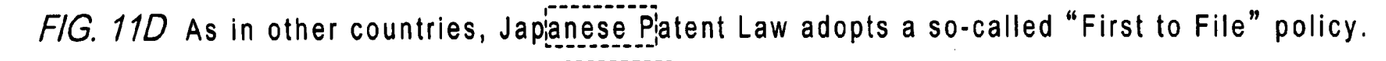
Figures 11E, 11F:
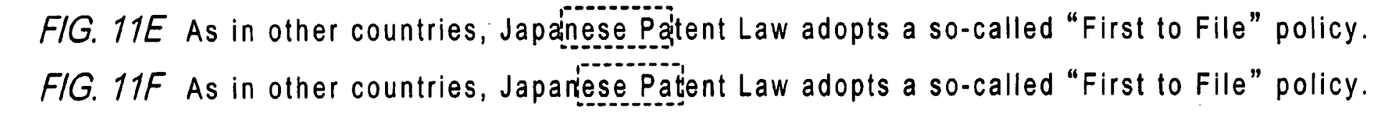
Figures 11G, 11H, 11I:
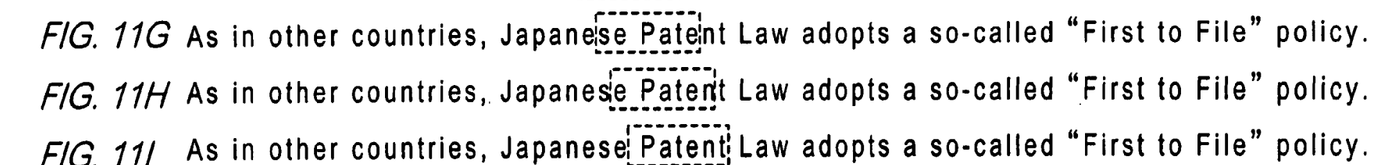
Figure 11J:
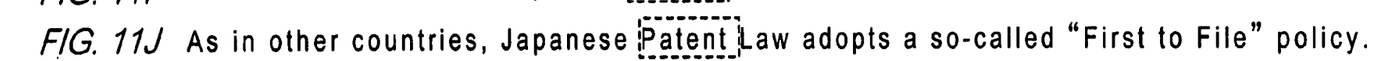
Figure 11K:
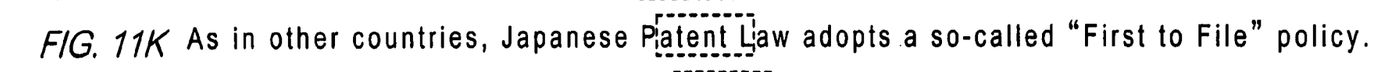
Figure 11L:
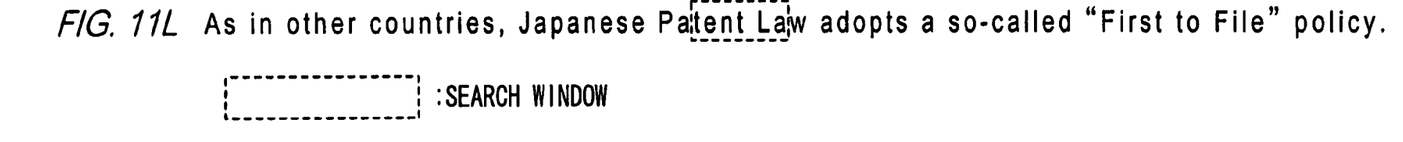

A success in performing character recognition depends on a quality of a document or on which character recognition is to be performed, and also on an environment in which the character recognition is to be performed. FIG. 9A shows an example of a document that includes soiling A. FIG. 9B shows a result of character recognition for the document shown in FIG. 9A. FIG. 9C is a drawing illustrating the character recognition malfunction that is shown in FIG. 9B.

In FIG. 9A, the document has document blocks 903 and 904. Each of the document blocks has four lines of character strings. In this case, there exists a problem in that during an OCR operation document blocks may not be recognized properly due to the presence of the soiling A on the document. In the example in FIG. 9B, the document block 904 is shown to be incorrectly recognized as having two separated document blocks. The first line of the document block 904 is incorrectly recognized as two separated lines, line 1 and line 5. Similarly, the second line of the document block 904 is incorrectly recognized as having two separated lines, line 2 and line 6. Furthermore, the third line of the document block 904 is also incorrectly recognized as having two separated lines, line 3 and line 7.

In a case such as that discussed above where an error in character recognition occurs, character strings may be recognized to occur in an order indicated by arrow b in FIG. 9C, instead of being correctly recognized as occurring, for example, in the order indicated by arrow a. When such a recognition error occurs, OCR is likely to generate incorrect text information and as a consequence, keywords in the generated text information may not be searchable.

JP-A-2001-337993 discloses a technology for improving accuracy of a keyword search. According to JP-A-2001-337993, a character(s) included in a keyword is searched for. Then, location information on the character(s) obtained by the search is extracted. The location of the keyword is estimated on the basis of the extracted location information; and, in addition, a keyword search is performed using pattern matching.

SUMMARY

JP-A-2001-337993 suffers from a problem in that a calculation load required for carrying out a keyword search is relatively high. Accordingly, JP-A-2001-337993 is not suitable for use in a device that has limited computing resources. A calculation load imposed by a search for example, when a keyword including m characters is searched for in a document including N characters, the calculation load depends on a value of m×N. Furthermore, the target area is determined on the basis of the keyword, in JP-A-2001-337993. Then, the keyword is searched for in the target area. Thus, JP-A-2001-337993 is subject to a high calculation load before a target area is determined.

An advantage of an aspect of the invention is to provide a system for searching character string(s) with less omissions while using significantly less resources.

According to an aspect of the invention, a searching device includes a text memory that stores text data, the text data showing at least one character strings, the character strings including n-number of characters, n being a natural number; an input device that receives an input of a keyword, the keyword including m-number of characters, m being a natural number that satisfies m≦n; a selector that selects at least one search character from the m-number of characters included in the keyword, the search characters including a-number of characters, a being a natural number that satisfies a≦m; a search window controller that sets a search window, the search window including b-number of characters, the b-number of characters being selected from the text data, b being a natural number that satisfies b≧a; a determining unit that determines whether the search window includes the keyword on the basis of a comparison result of the characters in the search window with the search characters.

The searching device may further include a memory that stores an accuracy table, the accuracy table including information showing a character and an accuracy of the character, wherein each of the search characters is a character corresponding to an accuracy that satisfies a predetermined condition.

The searching device may further include an updater that updates the search window in accordance with a predetermined algorithm.

The algorithm may be an algorithm by which the first character of the search window after update is the one next to the first character of the search window before update.

The algorithm may be an algorithm by which a predetermined number of characters exist between the first character of the search window after update and the first character of the search window before update.

The algorithm may be an algorithm by which at least one character exists between the first character of the search window after update and the first character of the search window before update, the one character being a character that does not agree with the search characters.

The search window controller may set the search window on the basis of at least one of a size of the character and a location of the character.

According to another aspect of the invention, a program product causes a computer device to execute: storing text data in a text memory, the text data showing at least one character strings, the character strings including n-number of characters, n being a natural number; receiving an input of a keyword, the keyword including m-number of characters, m being a natural number that satisfies m≦n; selecting at least one search character from the m-number of characters included in the keyword, the search characters including a-number of characters, a being a natural number that satisfies a≦m; setting a search window, the search window including b-number of characters, the b-number of characters being selected from the text data, b being a natural number that satisfies b≧a; determining whether the search window includes the keyword on the basis of a comparison result of the characters in the search window with the search characters.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
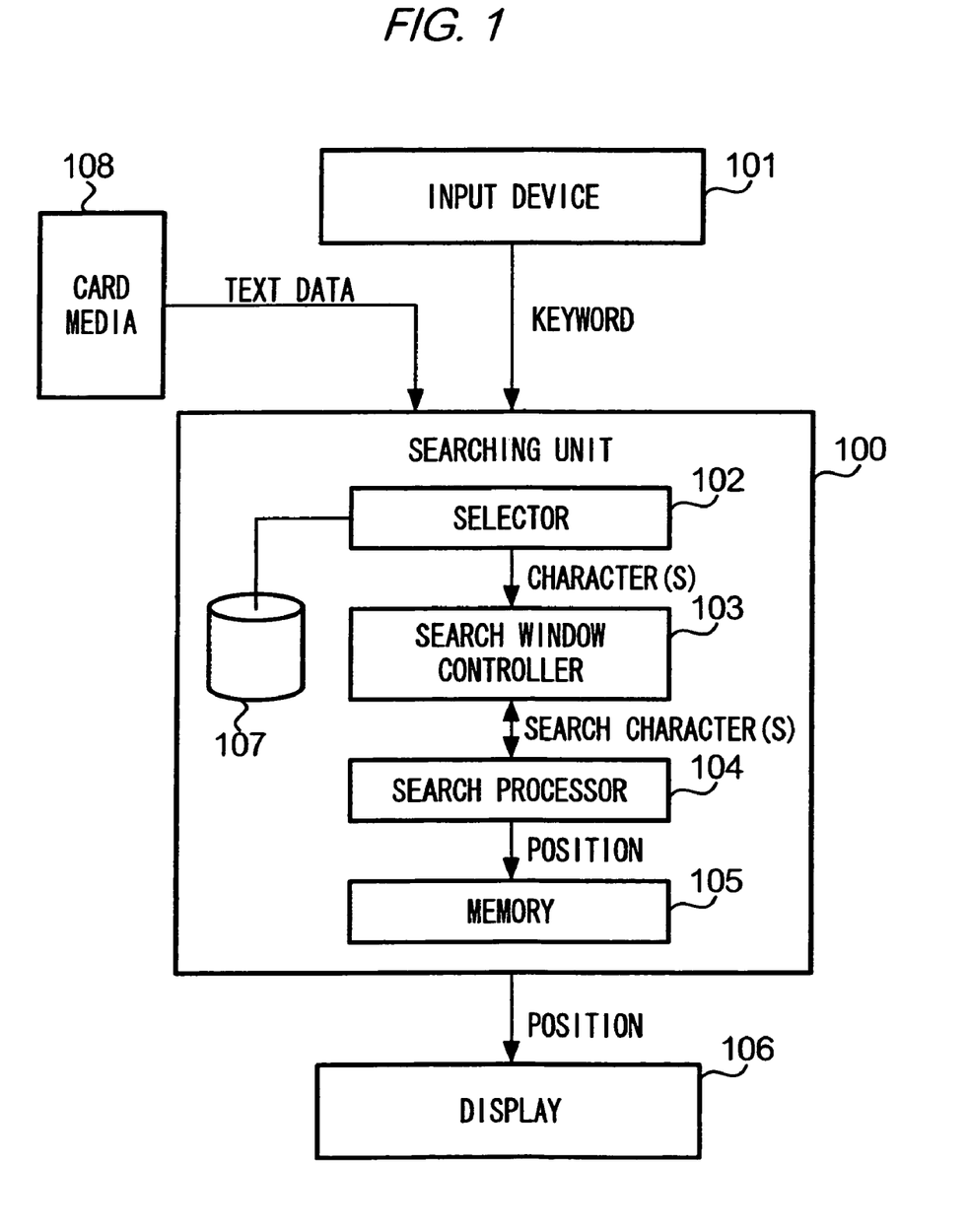
FIG. 1 shows a functional block diagram of a searching device in accordance with a first embodiment of the invention.
Figure 2A:
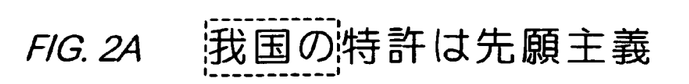
FIG. 2 illustrates generation of a search window by the search window controller 103.
Figure 2B:
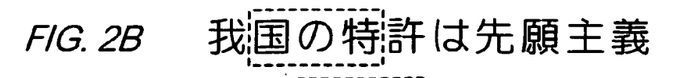
Figure 2C:
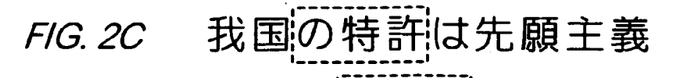
Figure 2D:
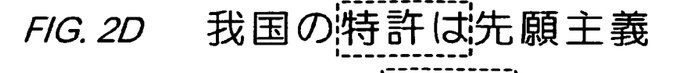
Figure 2E:
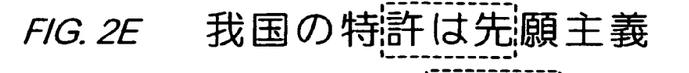
Figure 2F:
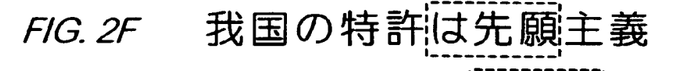
Figure 2G:
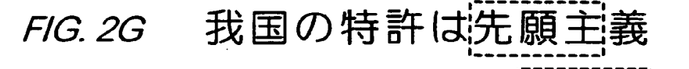
Figure 2H:
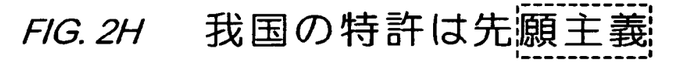

FIG. 1 shows a functional block diagram of a searching device in accordance with a first embodiment of the invention. In the present embodiment, the searching device is applied to a viewer of an electronic document such as an electronic book. The viewer is also referred to as "electronic paper".

In the present embodiment, text information is extracted, for example, by OCR, from image data generated from a document. The text information is stored as text data in a storage device such as a card media 108. The electronic paper reads the text information from the card media 108. The electronic paper displays the text information. A user inputs a keyword (or keywords) into the electronic-paper. The electronic paper searches the text information for the keyword(s).

The searching device extracts (a) keyword(s) from the text data. The text data shows character strings including n-number of characters. Here, n is a natural number. The keyword(s) include(s) m-number of characters. Here, m is a natural number that satisfies m≦n. The text data includes n-number of character data, each of which shows a character. Also, the text data may include information that shows a document block. Alternatively, the searching device may store information that shows a document block, as well as the text data. The searching device includes an input device 101, a searching unit 100, and display 106. The input device 101 receives input by a user of (a) keyword(s) (more specifically, keyword data that shows the keyword(s)) input by a user. The searching unit 100 compares such (a) keyword(s) with at least a part of the text data. Also, the searching unit 100 determines whether the text data includes a character string that agrees with the keyword. The display 106 displays the search result. In the present embodiment, display 106 includes a cholesteric liquid crystal display device.

Searching unit 100 determines agreement between search character(s) and a search window. The search character(s) include(s) a-number of characters selected from the m-number of characters in the keyword(s). Here, a is a natural number that satisfies a≦m. In other words, the search character(s) correspond(s) to at least a part of the keyword(s). The search window includes b-number of characters selected from the text data. Here, b is a natural number that satisfies a≦b. Thus, the searching unit 104 compares the keyword(s) with the text data.

The searching unit 100 further includes a search window controller 103 and a search processor 104. The search window controller 103 generates a search window. The search window includes successive characters selected from the text data. The search processor 104 determines whether the search window includes characters that agree with the search character(s) The searching unit 100 further includes a memory 105 that temporarily stores the search result.

The search result includes a displayed location of the target character string that agrees with (or "hits") the search character(s). The hit character(s) is/are indicated, for example, by being displayed in a different color from other characters of the text data.

The searching unit 100 further includes a selector 102 that selects a character(s) included in the search character(s). The text data is generated from the image data of the document, and the selector 102 determines the character(s) included in the search window on the basis of an accuracy of character recognition.

The electronic paper includes an accuracy table 107 that includes data showing the accuracy of character recognition. The selector 102 determines the accuracy of character recognition with reference to the accuracy table 107. The selector 102 selects the search character(s) from the keyword(s). The search character(s) include(s) at least a character that corresponds to an accuracy that is greater than a predetermined threshold.

FIG. 2 illustrates generation of a search window by the search window controller 103. In an example shown in FIG. 2, the text data includes character strings of "我国の特許は先願主義" in Japanese. In English this sentence reads: "In Japan, the Patent Law adopts a so-called 'First To File' policy". The keyword is "特許",which is Japanese for "patent". In the present embodiment, the search character is "特"and a character 許is not included in the search character.

The search window controller 103 determines a number of characters in the search window by, for example, adding a margin to the number of characters in the keyword. In this case, the keyword has two characters and the margin is one character. Therefore, the search window controller 103 determines that the number of characters in the search window is three. The search window controller 103 extracts as a search window three successive characters from the text data. In the present embodiment, these operations are referred to as "setting of the search window".

The search window controller 103 updates the search window as shown in FIG. 2. The location of the search window is updated one character at a time. Specifically, the memory in the electronic paper stores data corresponding to characters included in the search window. The memory updates the stored data in response to the update of the search window. For example, in a case that the text data includes characters in a language that is oriented in horizontal lines, the search window updates from left-to-right or from right-to-left. In a case that the text data includes characters in a language oriented in vertical lines, the search window updates from top-to-bottom.

In the example shown in FIG. 2, the search character "特"is included in search window (b). In this case, the number of hit characters is one and the number of search characters is also one. A hit rate is defined as a ratio of a number of hit characters to a number of search character(s). In this case, a hit rate in the search window (b) is 100%. The search processor 104 determines on the basis of a hit rate whether the keyword is hit. When the searching unit 100 determines that the keyword 特許is hit, the search processor 104 stores in the memory 105 the location of the hit character "特"as a location of the keyword. Then, the search window controller 103 updates the search window as shown in case (c). In search window (c), the search character "特"is also included. The search processor 104 adds to the memory 105 the location of the hit character when the location has not yet been stored. In case (c), the location is not added to the memory 105 because the location has already been stored.

Next, the search window controller 103 updates the search window as shown in case (d). The search window (d) also includes the search character(s) "特". The search processor 104 adds in the memory 105 the location of the hit character when the location has not yet been stored. In case (c), the location is not added to the memory 105 because the location has already been stored. Then the search window is updated as a search window (e). The search window (e) does not include the search character(s) "特". The search processor 104 determines that the keyword is not hit in search window (e).

In the above description, the search character(s) include(s) a single character. However, the search character(s) may include a plurality of characters. In this case, the search processor 104 may determine that the keyword is hit when the hit rate satisfies a given condition. It is to be noted that the hit rate may be defined on the basis of, for example, a number of different characters that agree with the search character(s), instead of the actual number of the characters.

According to the update of the search window, as shown in FIG. 2, the search unit 100 can reduce a possibility of any omission in the search.

The algorithm for updating the search window is not restricted to that described in the above embodiment. For example, a shift amount need not be restricted to a single character. The search window may be updated by shifting a predetermined number of characters. Alternatively, the search window may be updated in response to a location of a hit character. An example will be given for a case that the search character(s) include(s) four characters and the search window includes five characters. In a case that only the last two characters in the search window are hit with the search character(s), it is determined that the keyword is not hit because the hit rate is 50% less than the threshold. In this case, the search window controller 103 may update the search window by shifting three characters so that the first character of the search window is the hit character. In other words, the search window controller 103 may update the search window so that there is no hit character between the first character of the search window before update and the first character of the search window after update. According to the fast update, calculation load can be reduced. Therefore, a device having smaller software resources can perform the keyword search.

Figure 3:
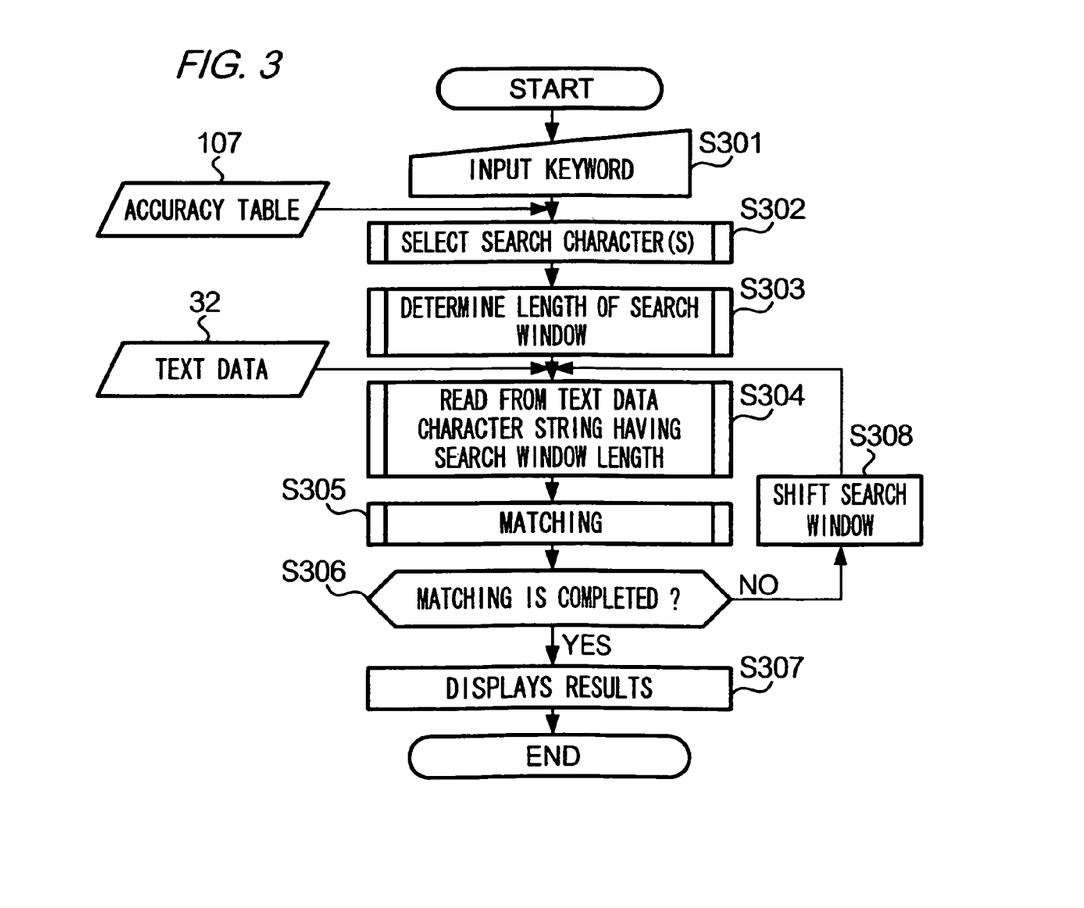
FIG. 3 is a flowchart illustrating operations of the searching unit in accordance with the present embodiment.

FIG. 3 is a flowchart illustrating operations of the searching unit in accordance with the present embodiment. In step S301, an operator inputs to the electronic paper (a) keyword(s) by the input device 101. In step S302, the selector 102 selects from among the keyword the search character(s) with reference to the accuracy table 107.

In step S303, the search window controller 103 determines the number of characters of the search window. In other words, the search window controller 103 determines the length of the search window. In step S304, the search window controller 103 reads from the text data a character string having the search window length. Furthermore, the search window controller 103 determines the characters included in the search window.

In step S305, the search processor 104 performs matching by a search window. In step S306, the search processor 104 determines whether the matching is completed for the text data. When the search processor 104 determines that the matching is not completed (S306: NO), the search processor 104 proceeds to the operation in step S308. In step S308, the search window controller 103 shifts the search window. The search window controller 103 sets the search window again.

When the search processor 104 determines that the matching is completed (S306: YES), the search processor 104 proceeds to the operation in step S307. In step S307, the display 106 displays the results of the keyword search.

Figure 4:
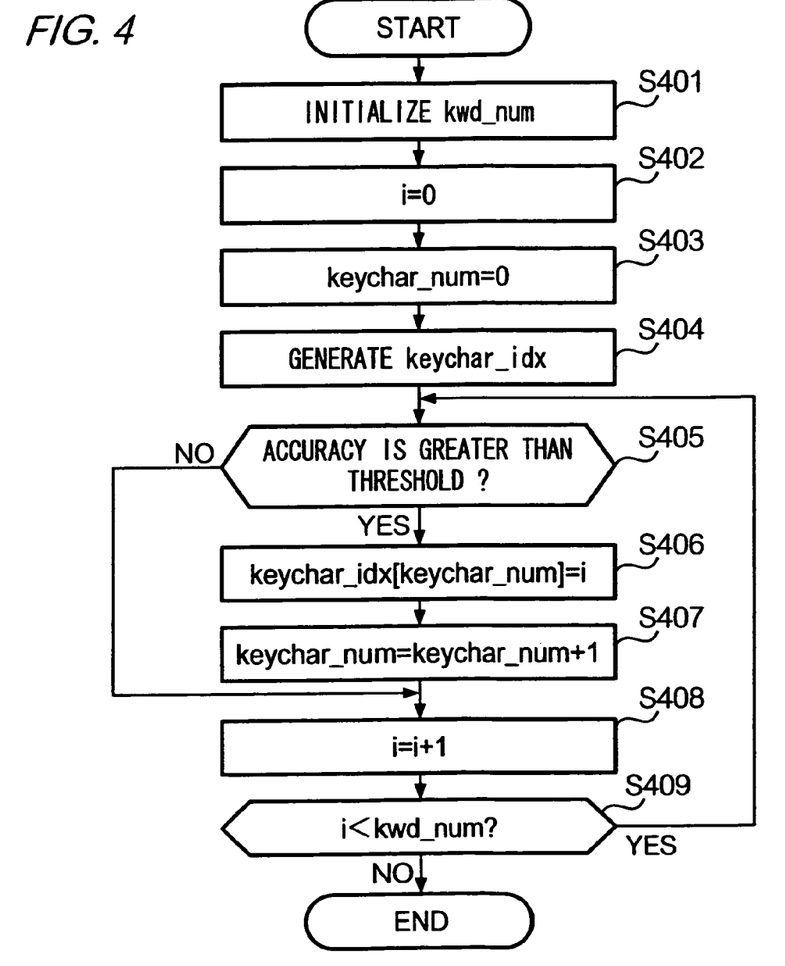
FIG. 4 is a flowchart illustrating determining the search character(s) when the selector 102 initializes parameters.

FIG. 4 is a flowchart illustrating determining the search character(s) when the selector 102 initializes parameters. In step S401, the selector 102 initializes a parameter kwd_num to be equal to the number of characters of the input keyword(s). In the example shown in FIG. 2, the parameter is initialized as kwd_num=2, because the keyword 特許includes two characters.

In step S402, the selector 102 initializes a parameter i as i=0. In step S403, the selector 102 initializes a parameter keychar_num as keychar_num=0. The parameter keychar_num is a parameter that shows a location of the search character(s) in the keyword. Then, in step S404, the selector 102 generates an array keychar_idx. The selector 102 obtains from the accuracy table 107 an accuracy of the i-th character of the keyword(s). The selector 102 compares the obtained accuracy with a predetermined threshold. The accuracy table 107 includes a plurality of data set, each of which includes a character (or an identifier of a character) and an accuracy corresponding to the character.

In step S405, the selector 102 determines whether the accuracy is greater than the threshold. When the selector 102 determines that the accuracy is not greater than the threshold (S405: NO), in step S408, the selector 102 updates the parameter i as i=i+1. In step S409, the selector 102 determines whether the parameter i satisfies i<keychar_num. When the selector 102 determines that the parameter i satisfies i<keychar_num (S409: YES), the selector 102 proceeds to the operation in step S405. When the selector 102 determines that the parameter i does not satisfy i<keychar_num (S409: NO), the selector 102 terminates the operations in FIG. 4.

When the selector 102 determines that the accuracy is greater than the threshold (S405: YES), in step S406, the selector 102 sets an element of the array keychar_idx [keychar_num]=i. In step S407, the selector 102 updates the parameter keychar_num as keychar_num=keychar_num+1. In step S408, the selector 102 updates the parameter i as i=i+1.

In the present embodiment, the accuracy of "特"is greater than the threshold (for example, 80%), and the accuracy of 許is not greater than the threshold. First, the selector 102 performs the operation for a character "特"of the keyword 特許. The array keychar_idx is set as keychar_idx

[0]=0. Also, the parameter keychar_num is set as keychar_num=1. Then, the parameter i is updated as i=1. The selector 102 performs the operation for a character "許".

Since the accuracy of the character 許 is not greater than the threshold, the operations in steps S406 and S407 are skipped. Then, the parameter i is updated as i=2. Then, the selector 102 terminates the operations because the parameter i satisfies i<keychar_num. It is to be noted that the character "特" is the search character(s) and the character 許 is not the search character(s).

Figure 5:
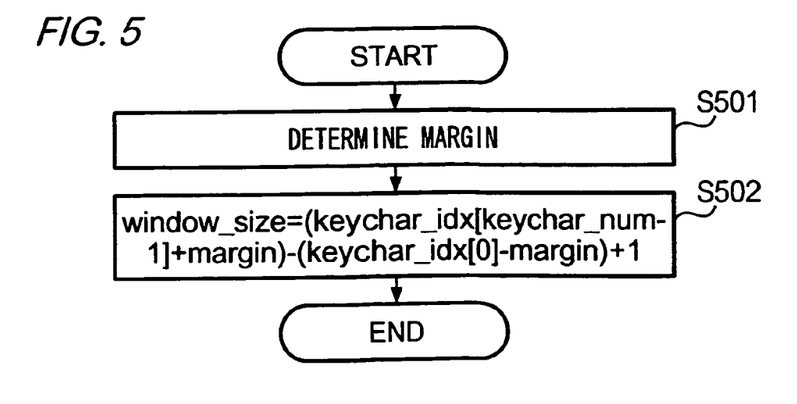
FIG. 5 is a flowchart illustrating determining the search window length.

FIG. 5 is a flowchart illustrating determining the search window length. In step S501, the search window controller 103 determines a value of a parameter margin. The value of the parameter margin may be predetermined. Alternatively, the value of the parameter margin may be determined by a user.

In step S502, the search window controller 103 determines a parameter window_size in accordance with the following equation (1). As shown in equation (1), the length of the search window is a function of the number of search character(s).

$$\text{window\_size}=(\text{keychar\_idx}[\text{keychar\_num}-1]+\text{margin})-(\text{keychar\_idx}[0]-\text{margin})+1 \quad (1)$$

In the present embodiment, the parameter window_size is determined as follows. In this case, the parameters are determined as margin=1, keychar_num=1, and keychar_idx [0]=0. These parameters are substituted in equation (1).

The result is: window_size=(0+1)−(0−1)=3.

Figure 6:
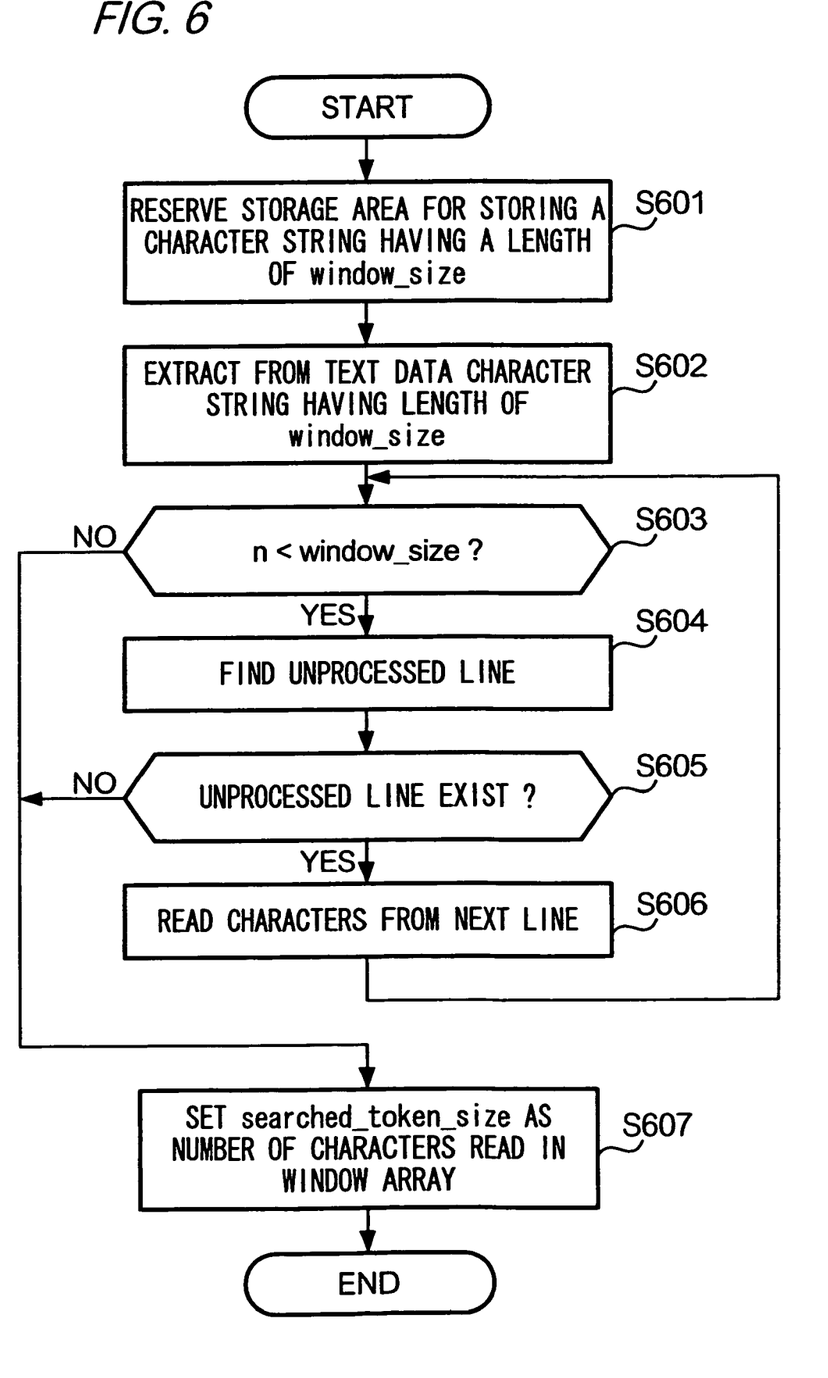
FIG. 6 is a flowchart illustrating the setting of the search window.

FIG. 6 is a flowchart illustrating the setting of the search window. In step S601, the search window controller 103 reserves a storage area for storing a character string having a length corresponding to the parameter window_size. The storage area is referred to as "window array". In step S602, the search window controller 103 extracts from the text data a character string having a length corresponding to the parameter window_size. It is to be noted that the window array corresponds to the search window.

In step S603, the search window controller 103 determines whether the number of characters stored in the window array is equal to the value of the parameter window_size. In other words, the search window controller 103 determines whether the number n of characters stored in the window array satisfies n<window_size. When the number of characters stored in the window array is equal to the parameter window_size (S603: NO), in step S607, the search window controller 103 sets a parameter searched_token_size as the number of characters read in the window array.

When the number of characters stored in the window array is smaller than the parameter window_size (S603: YES), in step S604, the search window controller 103 determines whether there is another line that is not processed yet. When the search window controller 103 determines that there is unprocessed line (S605: YES), in step S606, the search window controller reads characters from the next line. When the search window controller 103 determines that there is no unprocessed line (S605: YES), in step S607, the search window controller 103 sets a parameter searched_token_size as the number of characters read in the window array.

Figure 7:
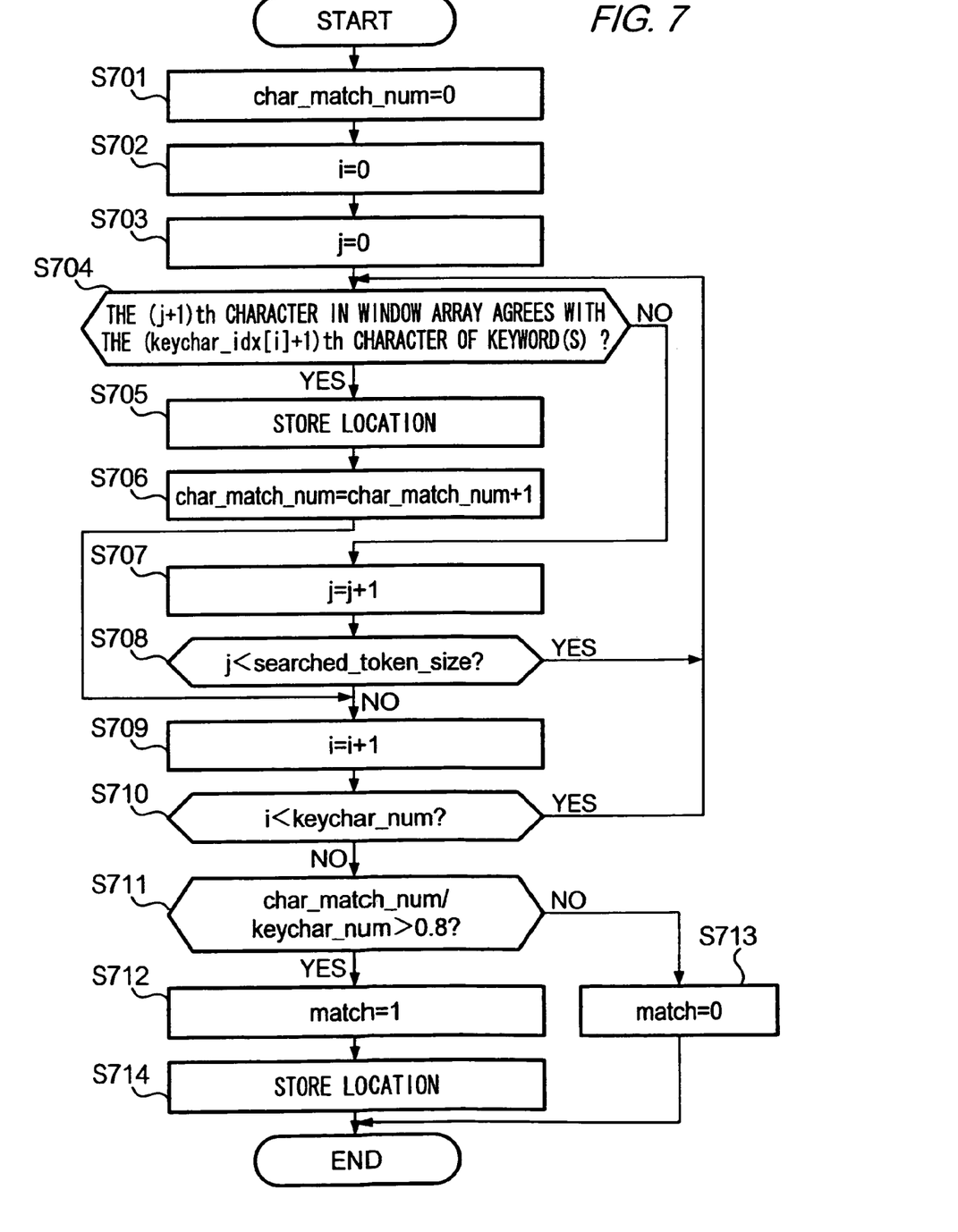
FIG. 7 is a flowchart illustrating the matching in step S305.

FIG. 7 is a flowchart illustrating the matching in step S305. The search processor 104 initializes parameters as char_match_num=0, i=0, and j=0, in steps S701, S702, and S703, respectively. It is to be noted that the parameter char_match_num shows that the number of characters in the text data agrees with the number of search character(s).

In step S704, the search processor 104 determines whether the (j+1)th character in the window array agrees with the (keychar_idx [i]+1)th character of the keyword(s). When the search processor 104 determines that these two characters agree with each other (step S704: YES), in step S705, the search processor 104 stores the location of the agreed character in the text data. Then, in step S706, the search processor 104 updates the parameter char_match_num as char_match_num=char_match_num+1.

In step S709, the search processor 104 updates the parameter i as i=i+1. In step S710, the search processor determines whether the parameter i satisfies a predetermined condition, i<keychar_num. When the parameter i satisfies the condition (S710: YES), the search processor 104 proceeds to the operation in step S704. In step S704, the search processor 104 determines whether the (j+1)th character in the window array agrees with the (keychar_idx [i]+1)th character of the keyword(s).

When the search processor 104 determines that the two characters does not agree with each other (step S704: NO), in step S707, the search processor 104 updates the parameter j as j=j+1. In step S708, the search processor 104 determines whether the parameter j satisfies a predetermined condition, j<searched_token_size. When the parameter j satisfies the condition (S708: YES), the search processor 104 proceeds to the operation in step S704. When the parameter j does not satisfy the condition (S708: NO), the search processor 104 proceeds to the operation in step S709.

When the parameter i does not satisfy the condition (S710: NO), the search processor 104 calculates a ratio char_match_num/keychar_num. The ratio shows the hit rate. Then, in step S711, the search processor 104 determines whether the ratio satisfies a predetermined condition, the parameter is greater than a threshold, for example, char_match_num/keychar_num>0.8. When the ratio satisfies the condition (S711: YES), in step S712, the search processor 104 determines a parameter match as match=1. The parameter match is a flag showing that the search window includes the keyword(s). Then, in step S714, the search processor 104 stores in the memory the location of the keyword(s). It is to be noted that there is no need to store duplicate locations in the memory.

When the ratio does not satisfy the condition (S711: NO), in step S713, the search processor 104 determines a parameter match as match=0.

Figure 8:
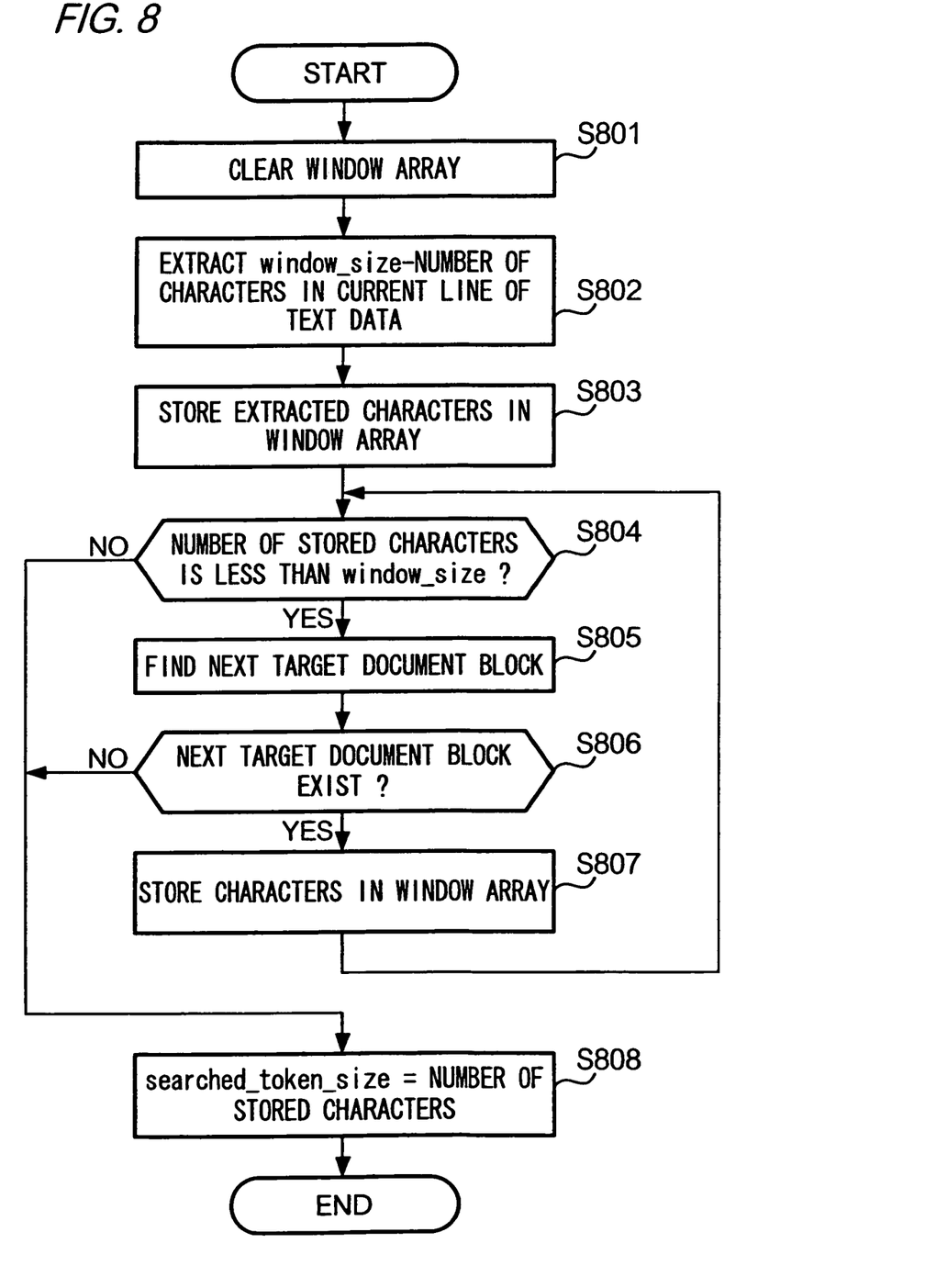
FIG. 8 shows a flowchart illustrating the window shift in step S308.

FIG. 8 shows a flowchart illustrating the window shift in step S308. After the matching is completed for a search window, the search processor 104 updates the search window by shifting the window by one character as shown in FIG. 2. First, in step S801, the search processor 104 clears the window array.

Then, in step S802, the search processor 104 extracts window_size-number of characters in the current line of the text data. The first character of the extracted characters is the next of the first character of the previous search window. In step S803, the search processor 104 stores the extracted characters in the window array. Then, in step S804, the search processor 104 determines whether the number of stored characters is less than the parameter window_size. When the search processor 104 determines that the number of stored characters is equal to the parameter window_size (S804: No), in step S808, the search processor 104 sets the value of a parameter searched_token_size as the number of the stored characters.

When the search processor 104 determines that the number of stored characters is smaller than the parameter window_size (S804: Yes), in step S805, the search processor 104 determines whether the next target document block exists. For example, the decision is made on the basis of the positional relationship between the current target document block and the next target document block. The term "target block" means a document block that is an object of the process. When the search processor 104 determines that the next target document block exists (S806: Yes), in step S807, the search processor 104 stores in the window array the characters from the next target document block. When the search processor 104 determines that the next target document block does not exist (S806: No), in step S808, the search processor 104 sets the value of a parameter searched_token_size as the number of the stored characters.

In the above description, the search window is updated so that the first character of the updated search window is the one next to the first character of the previous search window. However, the first character of the updated search window may be determined on the basis of character(s) that does not agree with the search character "特". In other words, the search processor 104 may skip at least one character when updating the search window. For example, in a case that the previous search window is case (a) in FIG. 2, the search processor 104 may be updated as case (d) in FIG. 2. For another example, in a case that the previous search window is case (b) in FIG. 2, the search processor 104 may be updated as case (d) in FIG. 2.

In step S805, the search processor 104 may include as a candidate of the next target block of a line 1 a line 5 as well as a line 2 in FIG. 9(*b*). In this case, line 2 is located under the current target block and line 5 is located to the right side of the current target block. This provides a search that is not obstructed by a scanning error.

In addition, the window controller 103 may determine an area from which the window controller 103 selects characters as the search window, on the basis of at least the size of characters or the displayed location of characters. For example, the window controller 103 may determine whether the distance between line 1 and line 5 is less than a threshold, or a distance corresponding to two characters, for example. When the window controller 103 determines that the distance is less than the threshold, the window controller 103 may determine that line 5 is one of the candidates of the next target block. When the window controller 103 determines that the distance is more than the threshold, the window controller 103 may determine that the line 5 is not a candidate of the next target block.

In a case that the distance between lines in a paragraph corresponds to one character and the distance between lines in two paragraphs corresponds to two characters, the threshold may be two characters. For example, when the distance between two blocks corresponds to one character, the window controller 103 treats the block as one block.

According to the present embodiment, the searching device can search for (a) keyword(s) in text data even when the text data includes incorrectly recognized characters when scanning. It is to be noted that the length of the search window may be determined on the basis of the capacity of an image scanner or an OCR.

In addition, the window controller 103 may determine the candidate of the next target block on the basis of an indent of a line.

2. Second Embodiment

Next, a second embodiment of the invention will be described. In the following, the descriptions common to the first embodiment are omitted. The difference between the first and the second embodiment is dominantly described. The elements common to the first embodiment are referred to by common reference numerals. In the second embodiment, the text data includes character strings of "日本の特許制度は、多くの国の制度と同様に先願主義を採用しています。" in Japanese. In English this sentence reads: "As in other countries, Japanese Patent Law adopts a so-called "First to File" policy.". The keyword is "特許制度",which is Japanese for "patent law".

In the second embodiment, the process is performed in accordance with the flowchart shown in FIG. 3. In step S301, a key word 特許制度is input. In step S302, the selector 102 selects search characters from the keyword(s) with reference to the accuracy table 107. In the present embodiment, the accuracy table 107 includes information that shows characters "特", "制",and "度"have accuracies greater than the threshold, and a character z,21 has an accuracy less than the threshold. Therefore, the search characters are determined as "特?制度. Here, a symbol "?" shows that the character located at the position is not a search character. In other words, the symbol "?" shows a so-called wildcard.

In step S303, the window controller 103 determines the search window length as six characters. In steps S304-S306 and S308, the window controller 103 and the search processor 104 determines whether a search window includes the search character(s).

FIG. 10 shows examples of the search window in the second embodiment. In step S304, the search window is determined so that the search window includes characters corresponding to the search window length (six characters). First, the characters are selected from the head of the text. In the example shown in FIG. 10, characters 日本の特許制are determined as a search window (FIG. 10(A)). In step S305, the search processor 104 performs the matching. In this case, the fourth character "特"and the sixth character 制agree with the search characters. The parameters char_match_num and key-char_num are determined as char_match_num=2 and key-char_num=3. Therefore, the hit rate is 67% in the case of FIG. 10(A). The threshold for the hit rate is 80% in the present embodiment. Therefore, the search processor 104 determines that the keyword is not hit in the search window. Because the operation is not completed for the text data (S306: No), the search window is updated in step S308. In other words, the search window shifts toward the right by one character.

Similarly, in a case (B) in FIG. 10, the third character "特", the fifth character "制",and the sixth character "度"agree with the search characters. Therefore, the hit rate is 100%. In a case (C) in FIG. 10, the second character "特", the fourth character "制",and the fifth character "度"agree with the search characters. Although the details are omitted, hit rates in cases (D)-(M) is 100%, 67%, 67%, 33%, 0%, 0%, 0%, 33%, 67%, and 67%, respectively.

In the present embodiment, the threshold for the hit rate is 80%. Therefore, it is determined that the keyword is hit in cases (B), (C), and (D) of FIG. 10. The location of the search characters are stored in the memory. The search processor 104 can identify the location of the keyword in the text data on the basis of the stored information.

3. Third Embodiment

Next, a third embodiment of the invention will be described. In the following, the descriptions common to the first embodiment are omitted. The difference between the first and the second embodiment is dominantly described. The elements common to the first embodiment are referred to by common reference numerals. In the third embodiment, the text data includes character strings of "As in other countries, Japanese Patent Law adopts a so-called "First to File" policy.". The keyword is "patent".

In the third embodiment, the process is performed in accordance with the flowchart shown in FIG. 3. In step S301, a key word "patent" is input. In step S302, the selector 102 selects search characters from the keyword(s) with reference to the accuracy table 107. In the present embodiment, the accuracy table 107 includes information that shows characters "p", "a", "e", and "n" have accuracies greater than the threshold, and a character "t" has an accuracy less than the threshold. Therefore, the search characters are determined as "pa?en?". Here, a symbol "?" shows that the character located at the position is not a search character. In other words, the symbol "?" shows a so-called wildcard.

In step S303, the window controller 103 determines the search window length as seven characters, in accordance with the equation (1). In steps S304-S306 and S308, the window controller 103 and the search processor 104 determines whether a search window includes the search character(s).

FIG. 11 shows examples of the search window in the third embodiment. In step S304, the search window is determined so that the search window includes characters corresponding to the search window length (seven characters). First, the characters are selected from the head of the text. In the example shown in FIG. 11, characters "As in o" are determined as a search window (FIG. 11(A)). It is to be noted that a space between two words is counted as one character. The system may count symbols such as a period, comma, quotation mark, or the like, as one character. In step S305, the search processor 104 performs the matching. In this case, no character in the search window agrees with the search characters. The parameters char_match_num and keychar_num are determined as char_match_num=0 and keychar_num=4. Therefore, the hit rate is 0% in the case of FIG. 11(A). The threshold for the hit rate is 80% in the present embodiment. Therefore, the search processor 104 determines that the keyword is not hit in the search window. Because the operation is not completed for the text data (S306: No), the search window is updated in step S308. In other words, the search window shifts toward the right by one character.

For example, in a case (G) of FIG. 11, the fourth character "p", the fifth character "a", and the seventh character "e" agree with the search characters. Therefore, the hit rate is 75%. In a case (H) in FIG. 11, the third character "p", the third character "a", the sixth character "e", and the seventh character "n" agree with the search characters. Therefore, the hit rate is 100%. Although the details are omitted, hit rates in cases (A)-(L) is 0%, 0%, 0%, 25%, 50%, 50%, 75%, 100%, 100%, 100%, 75%, and 50%, respectively.

In the present embodiment, the threshold for the hit rate is 80%. Therefore, it is determined that the keyword is hit in cases (H)-(J) of FIG. 11. The location of the search characters are stored in the memory. The search processor 104 can identify the location of the keyword in the text data on the basis of the stored information.

4. Further Embodiments

The invention is not restricted to the above described embodiments.

In the first and second embodiments, the text data shows texts written in Japanese. In the third embodiment, the text data shows text written in English. However, the invention can apply to other languages. The invention may be applied to text written in a language in which the sentence reads from top to bottom as in Japanese or Chinese. Furthermore, the invention may be applied to text written in a language in which the sentence reads from right to left as in Arabic.

The algorithm for updating the search window is not restricted to the above described embodiments. For example, an algorithm by which the first character of the search window after update is the one next to the first character of the search window before update, may be employed. Alternatively, an algorithm by which there is no hit character between the first character of the search window after update and the first character of the search window before update, may be employed.

What is claimed is:

1. A searching device, comprising:
    a text memory that stores text data, the text data showing at least one character strings, the character strings including n-number of characters, n being a natural number;
    an input device that receives an input of a keyword, the keyword including m-number of characters, m being a natural number that satisfies $m \leq n$;
    a selector that selects at least one search character from the m-number of characters included in the keyword, the search characters including a-number of characters, a being a natural number that satisfies $a \leq m$;
    a search window controller that sets a search window, the search window including b-number of characters, the b-number of characters being selected from the text data, b being a natural number that satisfies $b \geq a$;
    a determining unit that determines whether the search window includes the keyword on the basis of a comparison result of the characters in the search window with the search characters; and
    an updater that updates the search window in accordance with a predetermined algorithm, a length of the search window being constant before and after the update, the algorithm being an algorithm by which at least two characters exist between the first character of the search window after update and the first character of the search window before update, the at least two characters being characters that do not agree with the search characters,
    wherein
    the number of characters b is defined as follows:

$$b = (\text{keychar\_idx }[a-1] + \text{margin}) - (\text{keychar\_idx }[0] - \text{margin}) + 1,$$

keychar_idx [i] denotes an array showing a position of i-th character of the search characters in the keyword, and margin denotes a constant showing a margin of the search window.

2. A searching device according to claim 1, further comprising a table memory that stores an accuracy table, the accuracy table including information showing a character and an accuracy of the character, wherein each of the search characters is a character corresponding to an accuracy that satisfies a predetermined condition.

3. A searching device according to claim 1, wherein the algorithm is an algorithm by which the first character of the search window after update is the one next to the first character of the search window before update.

4. A searching device according to claim 1, wherein the algorithm is an algorithm by which a predetermined number of characters exist between the first character of the search window after update and the first character of the search window before update.

5. A searching device according to claim 1, wherein the search window controller sets the search window on the basis of at least one of a size of the character and a location of the character.

6. A program product stored on a storage device that when executed by a processor performs storing text data in a text memory, the text data showing at least one character strings, the character strings including n-number of characters, n being a natural number;

receiving an input of a keyword, the keyword including m-number of characters, m being a natural number that satisfies $m \leq n$;

selecting at least one search character from the m-number of characters included in the keyword, the search characters including a-number of characters, a being a natural number that satisfies $a \leq m$;

setting a search window, the search window including b-number of characters, the b-number of characters being selected from the text data, b being a natural number that satisfies $b \leq a$;

determining whether the search window includes the keyword on the basis of a comparison result of the characters in the search window with the search characters; and updating the search window in accordance with a predetermined algorithm, a length of the search window being constant before and after the update, the algorithm being an algorithm by which at least two characters exist between the first character of the search window after update and the first character of the search window before update, the at least two characters being characters that do not agree with the search characters, wherein the number of characters b is defined as follows:

$$b = (keychar\_idx\,[a-1] + margin) - (keychar\_{idx}\,[0] - margin) + 1,$$

keychar_idx [i] denotes an array showing a position of i-th character of the search characters in the keyword, and margin denotes a constant showing a margin of the search window.

* * * * *